US009258779B2

United States Patent
Glik et al.

(10) Patent No.: US 9,258,779 B2
(45) Date of Patent: Feb. 9, 2016

(54) APPARATUS, SYSTEM AND METHOD OF WIRELESS COMMUNICATION DURING A POWER SAVE STATE

(71) Applicants: Michael Glik, Kfar Saba (IL); Solomon B. Trainin, Haifa (IL); Elad Levy, Rishon LeZion (IL); Ofir Artstain, Netanya (IL)

(72) Inventors: Michael Glik, Kfar Saba (IL); Solomon B. Trainin, Haifa (IL); Elad Levy, Rishon LeZion (IL); Ofir Artstain, Netanya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/225,109

(22) Filed: Mar. 25, 2014

(65) Prior Publication Data

US 2015/0282072 A1 Oct. 1, 2015

(51) Int. Cl.
*H04M 1/00* (2006.01)
*H04W 52/02* (2009.01)
*H04W 76/04* (2009.01)

(52) U.S. Cl.
CPC .......... *H04W 52/0209* (2013.01); *H04W 52/02* (2013.01); *H04W 76/045* (2013.01); *H04W 52/0235* (2013.01)

(58) Field of Classification Search
CPC ............ H04W 52/02; H04W 52/0209; H04W 52/0235; H04W 76/045
USPC ................. 455/574, 572, 550.1, 127.1, 343.1
See application file for complete search history.

(56) References Cited

U.S. PATENT DOCUMENTS

| 2008/0057913 A1* | 3/2008 | Sinha | H04W 12/12 |
| | | | 455/414.1 |
| 2010/0115528 A1* | 5/2010 | Piipponen | H04B 1/0003 |
| | | | 718/104 |
| 2013/0077610 A1* | 3/2013 | Amini | H04W 52/0216 |
| | | | 370/338 |

FOREIGN PATENT DOCUMENTS

| KR | 20120094002 | 8/2012 |
| KR | 20130121161 | 11/2013 |
| WO | 2013020379 | 2/2013 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Khai M Nguyen
(74) *Attorney, Agent, or Firm* — Shichrur & Co.

(57) ABSTRACT

Some demonstrative embodiments include apparatuses, systems, devices and/or methods of wireless communication during a power save state. For example, a wireless network interface may be configured to interface between a wireless communication device and a wireless network. The wireless network interface may include a controller to receive an indication of a power save state of the wireless communication device, and to generate an Information Element (IE) including Transmit (Tx) filter setup information defining allowed frames, which are allowed to be transmitted to the wireless communication device during the power save state; and a transmitter to transmit the IE via the wireless network.

24 Claims, 5 Drawing Sheets

(56) References Cited

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group; Wi-Fi Peer-to-Peer (P2P) Technical Specification; Version 1.2; Dec. 14, 2011; 160 pages.

Wireless Gigabit Alliance (WGA) Specifications; WiGig MAC and PHY Specification Version 1.1, Apr. 2011—Final Specification; 442 pages.

International Search Report and Written Opinion for International Patent Application No. PCT/US2015/017449, mailed on May 28, 2015, 7 pages.

* cited by examiner

APPARATUS, SYSTEM AND METHOD OF WIRELESS COMMUNICATION DURING A POWER SAVE STATE

TECHNICAL FIELD

Embodiments described herein generally relate to wireless communication during a power save state.

BACKGROUND

A mobile device may switch from an active power mode to a power save mode during one or more idle periods, for example, to reduce power consumption of the mobile device and to extend a battery life of a battery of the mobile device.

During the power save mode, the mobile device may power down main elements of the device, e.g., a processor, a display, a memory and/or any other power-consuming elements of the mobile device, while maintaining a network interface of the mobile device powered up.

The network interface may analyze and/or process incoming network traffic, and may wake-up the mobile device only when required, for example, based on one or more conditions defined by the mobile device.

Offloading the processing and/or the analyzing of the incoming traffic from the main elements of the mobile device to the network interface enables the mobile device to power down the main elements during the power save mode, and to reduce power consumption of the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
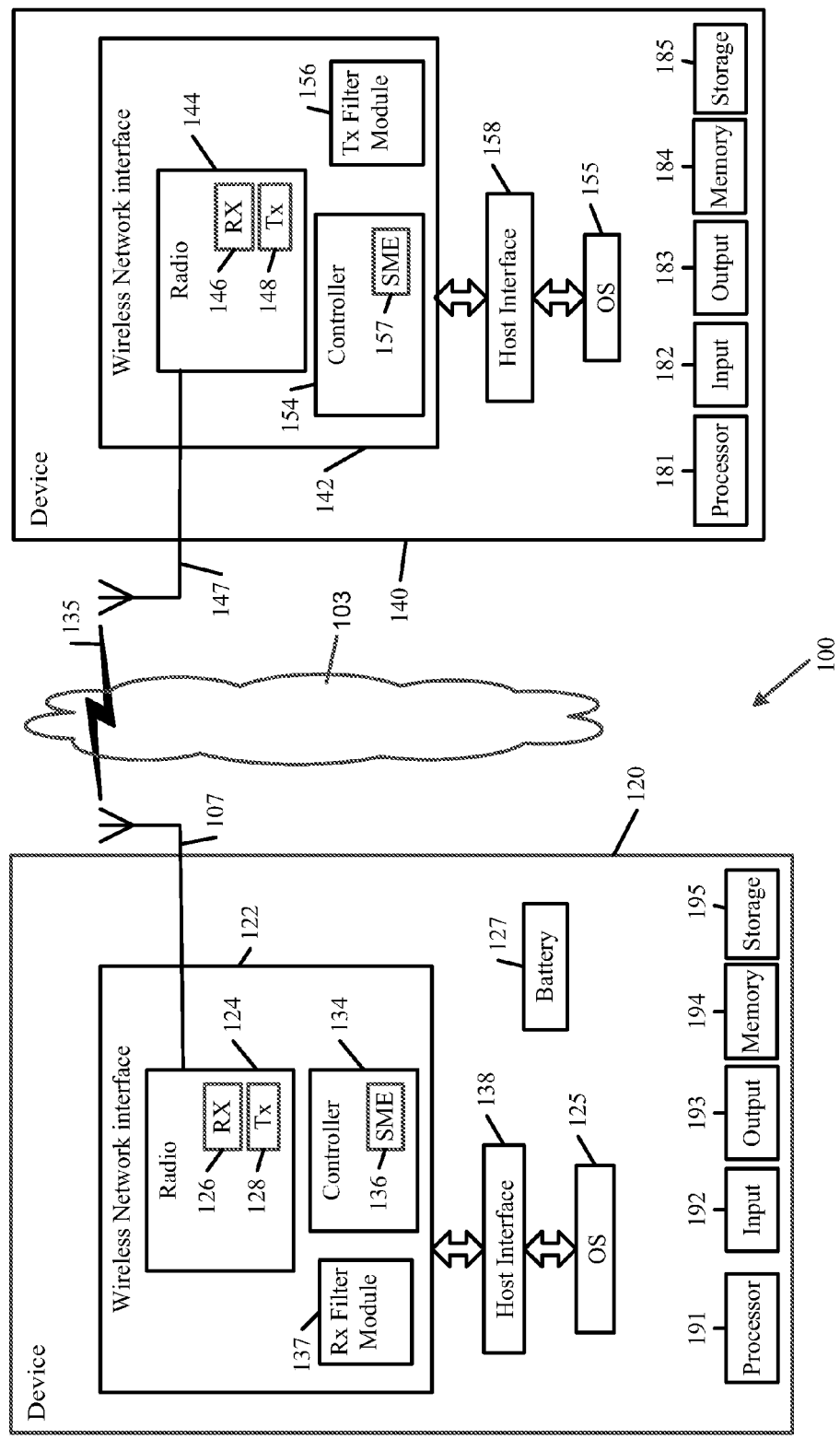
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a docking device, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11 task group ac (TGac)* ("*IEEE802.11-09/0308r12—TGac Channel Model Addendum Document*"); *IEEE 802.11 task group ad (TGad)* (*IEEE P802.11ad-2012, IEEE Standard for Information Technology—Telecommunications and Information Exchange Between Systems—Local and Metropolitan Area Networks—Specific Requirements—Part 11: Wireless LAN Medium*

Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification version* 1.2, 2012) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "powering down" and "power down" as used herein with relation to a device and/or a component may refer, for example, to reducing, diminishing, shutting down, powering off, turning off and/or switching off the electrical current to the device and/or component, and/or to switching the device and/or component to operate at a sleep mode, a reduced-power mode, a stand-by mode and/or any other operation mode which consumes less power than required for full and/or normal operation of the device and/or component.

The phrases "powering up", "power up", "wake up" and "waking up" as used herein with relation to a device and/or a component may refer, for example, to enhancing, resuming, turning on and/or switching on the electrical current to the device and/or component and/or to changing the device and/or component from sleep mode, stand by mode or any other operation mode, which consumes less power than required for full and/or normal operation of the device and/or component, to an operational mode.

The phrases "power save", "power-save state" and "idle power state", as used herein, with relation to a device and/or a component may refer, for example, to operation of the device and/or the component at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of data.

The phrases "active" and "active state", as used herein, with relation to a device and/or a component, may refer, for example, to an operational mode, which enables full and/or normal operation of the device and/or component, e.g., full reception, handling, decoding, transmitting and/or processing of data.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner", as used herein, may relate to an "AP-like" entity, when referring to non-DMG networks, or to a PCP, when referring to DMG networks that may provide and use connectivity between clients.

The phrase "P2P Group", as used herein, may relate to a set of devices including one P2P Group Owner and zero or more P2P Clients.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals over a wireless network 103. For example, system 100 may include a wireless communication device 120 and a wireless communication device 140.

In some demonstrative embodiments, wireless network 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, wireless communication devices 120 and/or 140 may include one or more wireless network interfaces to interface with wireless network 103. For example, wireless communication device 120 may include a wireless network interface 122 to interface between wireless communication device 120 and wireless network 103, and/or wireless communication device 140 may include a wireless network interface 142 to interface between wireless communication device 140 and wireless network 103.

In some demonstrative embodiments, wireless network interfaces 122 and/or 142 may include one or more radios to perform wireless communication between wireless communication device 120, wireless communication device 140, and/or one or more other wireless communication devices. For example, wireless network interface 122 may include a radio 124, and/or wireless network interface 142 may include a radio 144.

In some demonstrative embodiments, radios 124 and/or 144 may include one or more wireless receivers, able to receive wireless communication signals, RF signals, frames, blocks, transmission streams, packets, messages, data items, and/or data. For example, radio 124 may include a receiver 126, and/or radio 144 may include a receiver 146.

In some demonstrative embodiments, radios 124 and/or 144 may include one or more wireless transmitters, able to send wireless communication signals, RF signals, frames, blocks, transmission streams, packets, messages, data items, and/or data. For example, radio 124 may include a transmitter 128, and/or radio 144 may include a transmitter 148.

In some demonstrative embodiments, radios 124 and/or 144 may include modulation elements, demodulation elements, amplifiers, analog to digital and digital to analog converters, filters, and/or the like. For example, wireless network interfaces 122, and/or 142 may include or may be implemented as part of a wireless Network Interface Card (NIC), and the like.

In some demonstrative embodiments, radios 124 and/or 144 may communicate via a wireless communication link 135 between wireless communication device 120 and wireless communication device 140.

In some demonstrative embodiments, wireless communication link 135 may include a DMG wireless communication link.

In some demonstrative embodiments, wireless communication link 135 may include a peer-to-peer (P2P) communication link.

In some demonstrative embodiments, wireless communication link 135 may include a WiFi link.

In other embodiments, wireless communication link 135 may include any other wireless communication link.

In some demonstrative embodiments, wireless network interfaces 122 and/or 142 may include, or may be associated with, one or more antennas. For example, radio 124 may be associated with one or more antennas 107, and/or radio 144 may be associated with one or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication device 120 may also include, for example, a processor 191, an input unit 192, an output unit 193, a memory unit 194, and a storage unit 195; and/or wireless communication device 140 may also include, for example, a processor 181, an input unit 182, an output unit 183, a memory unit 184, and a storage unit 185. Wireless communication device 120, and/or wireless communication device 140 may optionally include other suitable hardware components and/or software components. In some demonstrative embodiments, some or all of the components of wireless communication device 120, and/or wireless communication device 140 may be enclosed in a common housing or packaging, and may be interconnected or operably associated using one or more wired or wireless links. In other embodiments, components of wireless communication device 120 and/or wireless communication device 140 may be distributed among multiple or separate devices.

Processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) 125 of wireless communication device 120 and/or of one or more suitable applications. Processor 181 may execute instructions, for example, of an Operating System (OS) 155 of wireless communication device 140 and/or of one or more suitable applications.

Memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by wireless communication device 120. Memory unit 184 and/or storage unit 185, for example, may store data processed by wireless communication device 140.

Input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, wireless communication devices 120 and/or 140 may include a mobile or a non-mobile device.

In some demonstrative embodiments, wireless communication devices 120 and/or 140 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, wireless communication device 140 may include a docking device connected to one or more peripherals, and wireless communication device 120 may include a mobile device. For example, the peripherals may include, for example, a display, a keyboard, a mouse, one or more loudspeakers, a Universal Serial Bus (USB) hub, an external storage, and/or the like.

In some demonstrative embodiments, device 140 may be configured to provide one or more functionalities to device 120 in a wireless manner. For example, device 140 may enable device 120 to utilize the peripherals and to use one or more functionalities associated with the peripherals in a wireless manner.

In another example, wireless communication device 140 and/or wireless communication device 120 may include any other device.

In some demonstrative embodiments, OS 125 may be configured to control operation and/or functionalities of wireless communication device 120.

In some demonstrative embodiments, OS 125 may switch device 120 between an active power state and a power save state. For example, OS 125 may switch device 120 from the active power state to the power save state to reduce power consumption of device 120, and to prolong a battery life of a battery 127 of device 120.

In one example, OS 125 may switch device 120 to the power save state during idle periods of device 120, for example, if device 120 is not being used, e.g., by a user of device 120 and/or by OS 125, for a relatively long period of time.

In some demonstrative embodiments, OS 125 may power down one or more elements of device 120, which may have increased power consumption, for example, to reduce a power consumption of device 120. For example, OS 125 may power down processor 191, output unit 193, e.g., a display of device 120, memory unit 194 and/or storage unit 195 during the power save state.

In some demonstrative embodiments, OS 125 may define one or more conditions ("the wake-up conditions) conditions to wake up device 120, and to switch device 120 from the power save state to the active power state.

In some demonstrative embodiments, the wake-up conditions may define allowed frames, which are allowed to be received by device 120 from wireless network 103 during the power save state, and to cause device 120 to switch to the active power state. For example, the allowed frames may include frames of a predefined type, a predefined size, a predefined content and/or the like.

In some demonstrative embodiments, wireless communication device 120 may include a host interface 138 configured to interface between OS 125 and wireless network interface 122.

In some demonstrative embodiments, host interface 138 may enable OS 125 to configure one or more elements of wireless network interface 122; and/or to transfer and/or to receive data, from the one or more elements of wireless network interface 122.

In some demonstrative embodiments, OS 125 may not power down wireless network interface 122 during the power save state, for example, to maintain connectivity to wireless network 103, and to enable device 120 to receive the allowed frames from network 103.

In some demonstrative embodiments, OS 125 may configure wireless network interface 122, e.g., via host interface 138, to wake up device 120 and to switch device 120 from the power save state to the active power state based on the predefined conditions.

In some demonstrative embodiments, wireless network interface 122 may be configured to wake up device 120, for example, if an allowed frame is received, e.g., by receiver 126.

In some demonstrative embodiments, wireless network interface 122 may be configured to determine whether or not a frame received by device 120 is an allowed frame.

For example, wireless network interface 122 may be configured to handle, process, and/or analyze frames received via wireless network 103, e.g., to determine whether or not a frame received by device 120 is an allowed frame.

In some demonstrative embodiments, wireless network interface 122 may be configured to perform one or more functionalities of one or more elements of device 120, during the power save state, for example, to determine whether or not a frame received by device 120 is an allowed frame, for example, while processor 191, memory 194 and/or one or more other elements of device 120 are powered down.

In some demonstrative embodiments, wireless network interface 122 may include a receive (RX) filter module 137 configured to filter frames received by receiver 126 via wireless network 103.

In some demonstrative embodiments, wireless network interface 122 may configure RX filter module 137 based on the wake-up conditions, for example, to process and provide to OS 125 only the allowed frames.

In some demonstrative embodiments, receiver 126 may receive frames from wireless network 103, and RX filter module 137 may filter the frames to process only allowed frames.

In some demonstrative embodiments, wireless network interface 122 may wake up device 120, e.g., via host interface 138, for example, if an allowed frame is received by receiver 126. RX filter module 137 may provide the allowed frame to OS 125 via network interface 138, for example, for further processing and/or handling.

In some demonstrative embodiments, waking up device 120, for example, only upon receiving an allowed frame, may enable device 120 to save power while maintaining responsiveness to communications from wireless network 103.

In one example, OS 125 may configure wireless network interface 122 to receive frames, which are directed to an Email application installed on device 120. According to this example, OS 125 may switch device 120 to the power save mode, and network interface 122 may wake-up device 120, for example, only if receiver 126 receives an allowed frame, e.g., a new Email from network 103. Waking up device 120, for example, only upon receiving an allowed frame, may enable device 120 to save power and to maintain responsiveness to Email communications from wireless network 103.

In some demonstrative embodiments, a wireless communication device in wireless network 103, e.g., device 140, may continue to transmit to device 120 frames, which are not allowed to be received by the device 120 ("non-allowed frames"), for example, if device 140 is not aware that device 120 is at the power save state.

In some demonstrative embodiments, device 140 may continue to transmit the non-allowed frames to device 120, for example, if device 140 is not aware, which frames are allowed to be received by device 120, e.g., according to the wake-up conditions of OS 125.

In some demonstrative embodiments, device 140 may continue to transmit the non-allowed frames to device 120, for example, if device 120 does not advertise, which frames are allowed to be received by device 120, and/or if device 120 does not advertise that device 120 is at the power save state.

In some demonstrative embodiments, a power consumption of device 120 may increase during the power save state, for example, if receiver 126 receives the non-allowed frames, and/or network interface 122 processes and/or handles the non-allowed frames, for example, to determine whether or not to wake-up device 120.

Some demonstrative embodiments may enable device 120 to advertise the power state of device 120, waking up filter conditions of RX filter module 137, and/or a setup of wireless communication link 135 during the power save state of device 120, e.g., as described below.

Some demonstrative embodiments may enable device 140 to determine which frames are to be transmitted to device 120, and how to transmit the frames to device 120 during the power-save state of device 120, e.g., as described below.

In some demonstrative embodiments, the power consumption of device 120 and/or 140 may be reduced, for example, if device 140 may transmit frames, which match the wake-up filter conditions and/or using the setup of wireless communication link 135.

In some demonstrative embodiments, wireless network interface 122 may include a controller 134 to receive an indication of a power save state of wireless communication device 120.

In some demonstrative embodiments, controller 134 may receive the power save state from OS 125, for example, via host interface 138.

In some demonstrative embodiments, controller 134 may receive from OS 125 configuration information of wireless communication device 120 during the power save state.

In some demonstrative embodiments, controller 134 may generate an Information Element (IE) including information relating to the power state of device 120.

In some demonstrative embodiments, the IE may include Transmit (Tx) filter setup information defining allowed frames, which are allowed to be transmitted to wireless communication device 120 during the power save state.

In some demonstrative embodiments, the IE may include communication link setup information defining a wireless communication link, e.g., link 135, to communicate with wireless communication device 120 during the power save state.

In some demonstrative embodiments, the IE may include a power state indicator to indicate the power state of device 120.

In some demonstrative embodiments, controller 134 may configure the Tx filter setup information and/or the communication link setup information based on the configuration information from OS 125.

Figure 2:
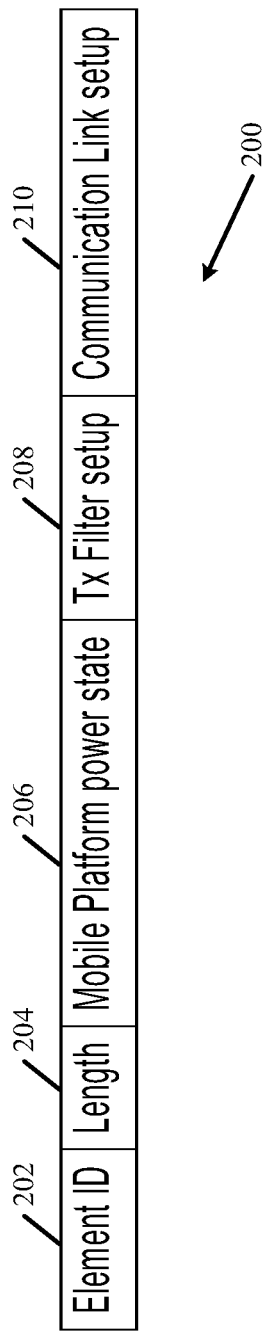
FIG. 2 is a schematic block diagram illustration of an information element (IE), in accordance with some demonstrative embodiments.

Reference is made to FIG. 2, which schematically illustrates an IE 200, in accordance with some demonstrative embodiments. For example, controller 134 (FIG. 1) may generate IE 200.

As shown in FIG. 2, IE 200 may include an Element ID field 202, a Length Field 204, a power state field 206, a Tx filter setup field 208, and/or a communication link setup field 210.

In some demonstrative embodiments, Tx filter setup field 208 may include the Tx filter setup information defining the allowed frames, which are allowed to be transmitted to wireless communication device 120 (FIG. 1) during the power save state.

In some demonstrative embodiments, the Tx filter setup information may include frame type information defining one or more allowed types of frames; frame pattern information defining one or more allowed frame patterns; size information defining one or more allowed frame sizes; and/or content information defining allowed frame content.

In one example, the Tx filter setup information may define the allowed frames to include frames of at least one type, e.g., management frames, control frames, and/or data frames; frames having a predefined pattern, e.g., a predefined frame body offset; frames having a frame size lesser or greater than a predefined frame size; and/or frames having at least one type of content, e.g., video content, audio content, news content and/or the like.

In some demonstrative embodiments, the Tx filter setup information may be based on the configuration information from OS 125 (FIG. 1).

In one example, the configuration information from OS 125 (FIG. 1) may define frames of an Email application as allowed frames. According to this example, the Tx filter setup information may include a frame type, a frame pattern and/or a frame content to match the frames of the Email application.

In some demonstrative embodiments, communication link setup field 210 may include communication link setup information defining a wireless communication link to communicate with wireless communication device 120 (FIG. 1) during the power save state of device 120 (FIG. 1). For example, the communication link setup information may define wireless communication link 135 (FIG. 1) to communicate with wireless communication device 120 (FIG. 1) during the power save state.

In some demonstrative embodiments, the communication link setup information may include antenna configuration information, Modulation and Coding Scheme (MCS) information, and/or scheduling information to communicate over wireless communication link 135 (FIG. 1) during the power save state.

In one example, the communication link setup information may include configuration of antennas 107 (FIG. 1) during the power save state of device 120 (FIG. 1); an MCS for communicating over wireless communication link 135 (FIG. 1) during the power save state of device 120 (FIG. 1); and/or scheduling information for communicating over wireless communication link 135 (FIG. 1) during the power save state of device 120 (FIG. 1).

In some demonstrative embodiments, the communication link setup of wireless communication link 135 (FIG. 1) during the power save state may be different from the communication link setup of wireless communication link 135 (FIG. 1) during the active power state.

In some demonstrative embodiments, the communication link setup of wireless communication link 135 (FIG. 1) during the power save state may be configured to maintain low power consumption of device 120 (FIG. 1), compared to the communication link setup of wireless communication link 135 (FIG. 1) during the active power state, which may be configured to enable maximum reception of data.

In one example, the configuration of antennas 107 (FIG. 1) during the power save state may include a single array antenna, e.g., instead of a phased array antenna, which may be used, for example, during the active state; the MCS for communicating over wireless communication link 135 (FIG. 1) during the power save state may include, for example, a low constellation MCS, e.g., 16 Quadrature Amplitude Modulation (QAM), for example, instead of a high constellation MCS, e.g., 64 QAM, which may be used, for example, during the active state; and/or the scheduling information during the power save state may include, for example, a low duty cycle scheduling, e.g., a low power extended schedule element (ESE), for example, instead of a high duty cycle scheduling, which may be used, for example, during the active state.

In some demonstrative embodiments, power state indicator field 206 may indicate a power state of device 120 (FIG. 1). For example, the power state indicator may indicate the power save state or the active power state of device 120 (FIG. 1).

In one example, controller 134 (FIG. 1) may set the power state indicator in field 206 to a first predefined value, e.g., "0", to indicate the power save state, for example, if OS 125 (FIG. 1) switches device 120 to the power save state.

In another example, controller 134 (FIG. 1) may set the power state indicator in field 206 to a second predefined value, e.g., "1", to indicate the active power state, for example, if OS 125 (FIG. 1) switches device 120 to the active power state.

Referring back to FIG. 1, in some demonstrative embodiments, controller 143 may set the power state indicator in field 206 (FIG. 2) to indicate the power save state of device 120, the communication link setup information in field 210 (FIG. 2) to define the allowed frames, and/or the communication link setup information in field 210 to define the communication link setup information of wireless communication link 135.

In some demonstrative embodiments, controller 134 may include a station management entity (SME) 136 to receive the indication of the power save state, e.g., from OS 125, and to configure transmitter 128 to transmit IE 200 (FIG. 2) via wireless network 105.

In some demonstrative embodiments, transmitter 128 may transmit IE 200 (FIG. 2) via wireless communication link 135 over wireless network 103.

In some demonstrative embodiments, wireless communication device 140 may receive IE 200 (FIG. 2) from wireless communication device 120.

In some demonstrative embodiments, receiver 146 may receive IE 200 (FIG. 2) including the power state indicator being set to indicate the power save state of device 120, the TX filter setup information defining the allowed frames, which are allowed to be transmitted, to wireless communication device 120 during the power save state, and the communication link setup information in field 210 to define the communication link setup information of wireless communication link 135 during the power save state.

In some demonstrative embodiments, wireless network interface 140 may include a controller 154 to control transmissions of device 140.

In some demonstrative embodiments, OS 155 may be configured to control operation and/or functionalities of wireless communication device 140.

In some demonstrative embodiments, wireless communication device 140 may include a host interface 148 configured to interface between OS 145 and wireless network interface 142.

In some demonstrative embodiments, host interface 148 may enable OS 145 to configure one or more elements of wireless network interface 142; and/or to transfer and/or to receive data from the one or more elements of wireless network interface 142.

In some demonstrative embodiments, host interface 148 may enable OS 145 to provide to controller 154 frames to be transmitted to device 120.

In some demonstrative embodiments, controller 154 may receive the frames to be transmitted to device 120, e.g., via host interface 148.

In some demonstrative embodiments, wireless network interface 142 may include a transmit (Tx) filter module 156 configured to filter frames to be transmitted, e.g., by transmitter 156, via wireless network 103.

In some demonstrative embodiments, controller 154 may configure Tx filter module 156 to select one or more of the frames from OS 145, based on the Tx filter setup information, e.g., as received in field 208 of IE 200 (FIG. 2).

In some demonstrative embodiments, controller 154 may include an SME 157 configured to receive the Tx filter setup information from receiver 146, and to configure Tx filter module 156 based on the Tx filter setup information.

In one example, SME 157 may configure Tx filter module 156 to select frames based on a size criterion, for example, frames having a size lesser than a predefined size, e.g., if the Tx filter setup information defines the allowed frames to include frames having a size lesser then the predefined size.

In another example, SME 157 may configure Tx filter module 156 to select frames based on a content of the frames, for example, frames having a video content, e.g., if the Tx filter setup information defines the allowed frames to include frames having video content.

In another example, SME 157 may configure Tx filter module 156 to select frames based on a type of the frames, for example, frames of a control type, e.g., if the Tx filter setup information defines the allowed frames to include frames of the control type.

In another example, SME 157 may configure Tx filter module 156 to select frames based on any other criterion, e.g., as defined by the Tx filter setup information.

In some demonstrative embodiments, transmitter 148 may be configured to transmit the one or more selected frames to device 120.

In some demonstrative embodiments, controller 134 may configure transmitter 148 based on the communication link setup information, e.g., as received in IE 200 in field 210 (FIG. 2).

In one example, controller 134 may configure transmitter 148 to transmit the one or more selected frames via wireless communication link 135 utilizing a particular MCS, e.g., MCS1, for example, if the communication link setup information defines the particular MCS.

In another example, controller 134 may configure transmitter 148 to transmit the one or more selected frames utilizing a particular scheduling scheme, e.g., a low power ESE, for example, if the communication link setup information defines the particular ESE.

In another example, controller 134 may configure transmitter 148 to transmit the one or more selected frames utilizing a particular antenna configuration, e.g., a single antenna, for example, if the communication link setup information defines the particular antenna configuration.

In another example, controller 134 may configure transmitter 148 to transmit the one or more selected frames based on any other configuration defined in the communication link setup information.

In some demonstrative embodiments, device 120 may switch to the active power state.

In one example, device 120 may switch to the active power state, for example, in response to an operation of the user of device 120, e.g., pressing a button to wake up device 120.

In another example, device 120 may switch to the active power state, for example, if wireless network interface 122 receives one or more allowed frames.

In some demonstrative embodiments, controller 134 may receive an indication of an active power state of wireless communication device 120. For example, controller 134 may receive the indication from OS 125, e.g., via host interface 138.

In some demonstrative embodiments, controller 134 may generate an IE including the power state indicator set to indicate the active power state. For example, controller 134 may generate another IE 200 (FIG. 2) including the power state indicator in field 206 (FIG. 2) being set to indicate the active power state.

In some demonstrative embodiments, transmitter 128 may transmit to device 140 the IE including the power state indicator set to indicate the active power state.

In some demonstrative embodiments, receiver 148 may receive the IE including the power state indicator being set to indicate the active power state.

In some demonstrative embodiments, controller 154 may reset Tx filter module 156, e.g., upon receipt of the IE with the power state indicator being set to indicate the active power state.

In one example, controller 154 may configure Tx filter module 156 to select only one or more frames having video content to be transmitted to device 120, and upon receipt of the IE with the power state indicator being set to indicate the active power state, controller 154 may reset Tx filter module 156, for example, to enable all frames to be transmitted to device 120.

In some demonstrative embodiments, advertising the power state of device 120 and the definition of the allowed frames may enable to reduce power consumption of device 120 and to prolong a battery life of battery 127.

In some demonstrative embodiments, receiving the power state of device 120 and the definition of the allowed frames to be received by the device 120 may enable device 140 to select one or more frames to be transmitted to device 120, and to reduce power consumption of device 140, for example, by not handling and/or processing the non-allowed frames.

In some demonstrative embodiments, network interfaces 122 and/or 142 may enable discovery of wireless communication devices 120 and/or 140, for example, during the power save state of device 120.

In some demonstrative embodiments, network interfaces 122 and/or 142 may enable full connection between wireless communication devices 120 and 140, for example, only if device 120 is at the active power mode, e.g., as described below.

In one example, device 120 may include a mobile device, e.g., a laptop, and/or device 140 may include a docking device. According to this example, network interfaces 122 and/or 142 may enable discovery of the docking device by the mobile device, for example, if the mobile device is at the power save state. However, a full connection between the docking device and the laptop may not be established, for example, if the mobile device is not at the active power state.

In some demonstrative embodiments, controller 134 may transmit a connect invitation to device 140 including an IE with the power state indicator set to indicate the power save state.

In some demonstrative embodiments, the connect invitation may include an invitation to establish a connection with device 140.

In some demonstrative embodiments, receiver 146 may receive the connect invitation including the invitation to establish the connection with device 140, and the power state indicator indicating the power save state.

In some demonstrative embodiments, controller 134 may execute an association phase of the connection establishment, for example, upon receipt of an indication that device 120 is at the active state.

Figure 3:
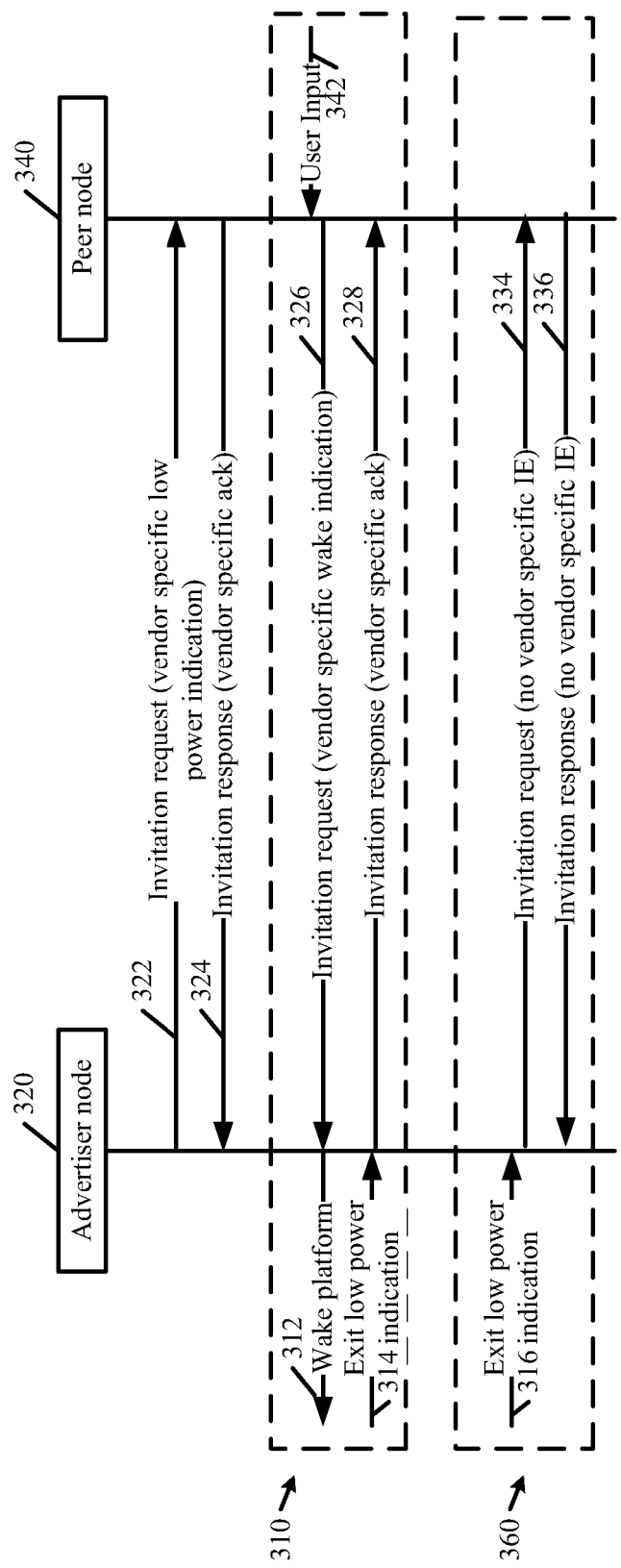
FIG. 3 is a schematic sequence diagram of operations and interactions between a first wireless communication device and a second wireless communication device, in accordance with some demonstrative embodiments.

Reference is made to FIG. 3, which schematically illustrates a sequence diagram 300 of operations and interactions between a first wireless communication device 320 and a second wireless communication device 340, in accordance with some demonstrative embodiments. For example, wireless communication device 320 may perform the functionality of wireless communication device 120 (FIG. 1), and/or wireless communication device 340 may perform the functionality of wireless communication device 140 (FIG. 1).

In one example, wireless communication device 320 may include a mobile device and/or wireless communication device 340 may include a docking device.

As shown in FIG. 3, device 320 may transmit an invitation request 322 to request to establish a connection between device 320 and device 340.

In some demonstrative embodiments, invitation request 322 may include a power state indicator indicating device 320 is at the power save state. For example, device 120 (FIG. 1) may transmit invitation request 322 to device 140 (FIG. 1).

As shown in FIG. 3, device 340 may transmit to device 320 an invitation response 324, in response to invitation request 322, to acknowledge receipt of invitation request 322. For example, device 140 (FIG. 1) may transmit invitation response 324 to device 120 (FIG. 1).

In some demonstrative embodiments, device 320 and device 340 may not complete the establishment of the connection between device 320 and device 340, for example, device 320 and device 240 may not proceed to an association phase between device 320 and device 340, e.g., if device 320 is not at the active power state.

In one example (310), device 340 may initiate (342) switching device 320 from the power save state to the active power state. For example, the user of wireless communication device 320 may perform an action (342) on device 340 to cause device 320 to exit from the power save state.

As shown in FIG. 3, device 340 may transmit to device 320 an invitation request 322, to request device 320 to wake up and to complete the establishment of the connection between device 320 and device 340. For example, device 140 (FIG. 1) may transmit invitation request 326 to device 120 (FIG. 1).

As shown in FIG. 3, device 320 may receive invitation request 326, and may wake up (312) device 320 from the power save mode.

As shown in FIG. 3, device 320 may receive an indication 314, e.g., from an OS of device 320, to indicate that that device 320 is at the active power state.

As shown in FIG. 3, device 320 may send an invitation response 328 to acknowledge receipt of invitation request 326, and to complete the establishment of the connection between device 320 and device 340.

In another example (360), device 320 may initiate (316) switching device 320 from the power save state to the active power state. For example, the user of device 320 and/or the OS of device 320 may perform an action (316) to initiate device 320 to exit from the power save state.

As shown in FIG. 3, device 320 may transmit to docking device 320 an invitation request 334, to complete the establishment of the connection between device 320 and device 340. For example, device 120 (FIG. 1) may transmit invitation request 334 to device 140 (FIG. 1).

As shown in FIG. 3, device 340 may receive invitation request 334 and may send an invitation response 336 to device 320 to acknowledge receipt of invitation request 334, and to complete the establishment of the connection between device 320 and device 340. For example, device 140 (FIG. 1) may transmit invitation response 336 to device 120 (FIG. 1).

Figure 4:
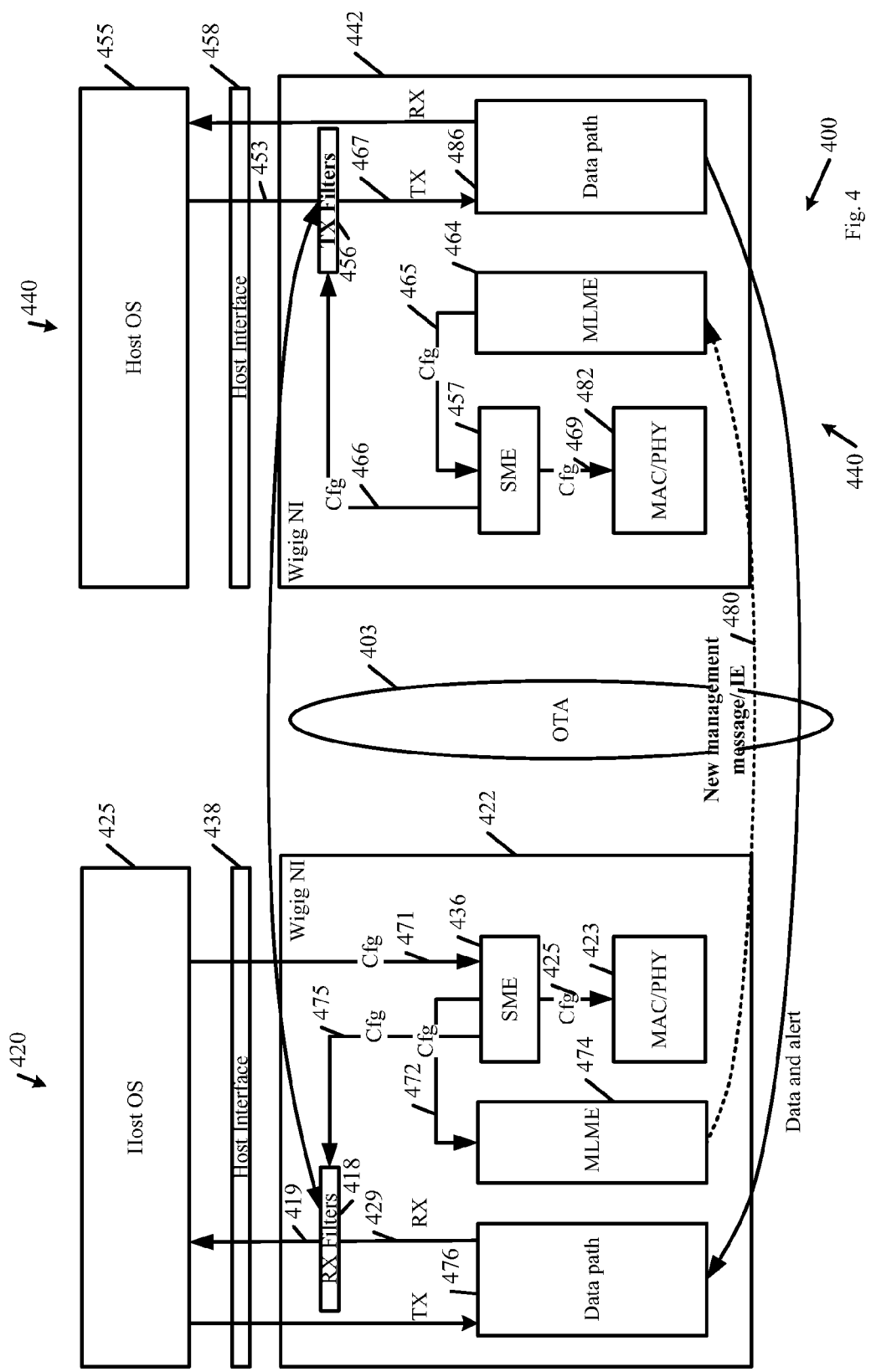
FIG. 4 is a schematic block diagram illustration of a system, in accordance with some demonstrative embodiments.

Reference is made to FIG. 4, which schematically illustrates a system 400, in accordance with some demonstrative embodiments. For example, system 400 may perform the functionality of system 100 (FIG. 1).

In some demonstrative embodiments, system 400 may include a wireless communication device 420 and a wireless communication device 440. For example, device 420 may perform the functionality of wireless communication device 120 (FIG. 1), and/or device 440 may perform the functionality of wireless communication device 140 (FIG. 1).

In some demonstrative embodiments, device 420 may include a host OS 425, a network interface 422, and a host interface 438 interfacing between host OS 425 and network interface 422. For example, host OS 425 may perform the functionality of OS 125 (FIG. 1), network interface 422 may perform the functionality of network interface 122 (FIG. 1) and/or host interface 438 may perform the functionality of host interface 138 (FIG. 1).

In some demonstrative embodiments, device 440 may include a host OS 455, a network interface 442, and a host interface 458 interfacing between host OS 455 and network interface 442. For example, host OS 455 may perform the functionality of OS 155 (FIG. 1), network interface 442 may perform the functionality of network interface 142 (FIG. 1) and/or host interface 458 may perform the functionality of host interface 158 (FIG. 1).

As shown in FIG. 4, wireless network interfaces 422 and/or 442 may include a Wireless Gigabit (WiGig) network interface.

As shown in FIG. 4, device 420 and device 440 may communicate over a wireless network 403.

In some demonstrative embodiments, wireless network interface 422 may include an SME 436 configured to manage one or more operations of network interface 422; a Media Access Control (MAC) Layer Management Entity (MLME) 474 to manage one or more operations of a MAC layer of network interface 422; a data path 476 to receive from OS 425 one or more frames to be transmitted via wireless network 403 and/or to provide to OS 425 one or more frames 419 received from wireless network 403; and/or a MAC/PHY module 423 to communicate via wireless network 103. For example, SME 436 may perform the functionality of SME 136 (FIG. 1), and/or MAC/PHY module 423 may perform the functionality of radio 124 (FIG. 1).

In some demonstrative embodiments, wireless network interface 422 may include an RX filter module 418 configured to filter the one or more frames 429 received from wireless network 403 and to provide frames 419 to OS 425. For example, RX filter module 418 may perform the functionality of RX filter module 137 (FIG. 1).

In some demonstrative embodiments, wireless network interface 442 may include an SME 457 configured to manage one or more operations of network interface 442, an MLME 464 to manage one or more operations of a MAC layer of network interface 442, a data path 486 to receive from OS 455 one or more frames 453 to be transmitted via wireless network 403 and/or to provide OS 455 one or more frames received from wireless network 403; and/or a MAC/PHY module 482 to communicate via wireless network 103. For example, SME 457 may perform the functionality of SME 157 (FIG. 1), and/or MAC/PHY module 482 may perform the functionality of radio 144 (FIG. 1).

In some demonstrative embodiments, wireless network interface 442 may include a TX filter module 456 configured to filter the one or more frames 453 from OS 455, and to transmit frames 467 of frames 453 via wireless network 403. For example, TX filter module 456 may perform the functionality of TX filter module 156 (FIG. 1).

In some demonstrative embodiments, device 420 may switch from the active power state to the power save state and may communicate the power state of device 420, e.g., as described below.

In some demonstrative embodiments, OS 425 may provide an indication to SME 436, e.g., via interface 438, of the switching of device 420 from the active power state to the power save state.

In some demonstrative embodiments, OS 425 may configure (471) SME 436 with the wake-up conditions to wake up device 420.

As shown in FIG. 4, SME 436 may configure (472) MLME 474, and may configure (475) RX filter module 418 according to the wake-up conditions, for example, to prevent from non-allowed frames of frames 429 to be provided to OS 425.

As shown in FIG. 4, SME 436 may configure (425) MAC/PHY module 423 according to the communication Link setup during the power save state.

As shown in FIG. 4, SME 436 may generate an IE 480 to enable communication of the wake-up conditions to another device, e.g., device 440. IE 480 may include the Tx Filter setup information and the communication Link setup information.

As shown in FIG. 4, device 420 may transmit IE 480 to device 440 via wireless network 403.

As shown in FIG. 4, MLME 464 may receive IE 480 and may provide (465) the Tx Filter setup information and the communication Link setup information to SME 457.

As shown in FIG. 4, SME 457 may configure (466) Tx filter module 456 according to the Tx Filter setup information, for example, upon reception of IE element 480.

In some demonstrative embodiments, Tx filter module 456 may select from frames 453 received from OS 455 one or more frames 467, e.g., of limited frames types and/or sizes and/or with limited content, for example, according to the Tx Filter setup information.

In some demonstrative embodiments, device 440 may transmit frames 467 to device 420, e.g., for example, when device 420 is at the power save state.

In some demonstrative embodiments, device 440 may transmit to device 420 only a limited set of frames 467, e.g., limited frames types and/or with limited content, according to the Tx Filter setup information, for example, when device 420 is at the power save state.

In some demonstrative embodiments, transmitting frames 467 to device 420 may enable wireless network interface 422 to receive from device 440 only the allowed frames complying with the wake-up conditions.

As shown in FIG. 4, SME 457 may configure (469) MAC/PHY module 482 according to the communication Link setup information, for example, upon reception of IE 480.

In some demonstrative embodiments, device 440 may be limited to communicate utilizing a low power mechanism, for example, using a single antenna on RX path instead of a phase array antenna, using a low constellation modulation and a low coding scheme, using a low duty cycle scheduling and/or the like, e.g., if device 420 is at the power save state.

In some demonstrative embodiments, device 420 may switch from the power save state to the active power state.

In some demonstrative embodiments, SME 457 may reset (466) Tx Filter module 456, for example, if device 440 receives an IE with the power state indicator indicating device 420 is at the active power state.

In some demonstrative embodiments, SME 457 may reset (469) MAC/PHY module 482, e.g., to enable optimal data transfer conditions, for example, if device 440 receives the IE with the power state indicator indicating device 420 is at the active power state.

Figure 5:
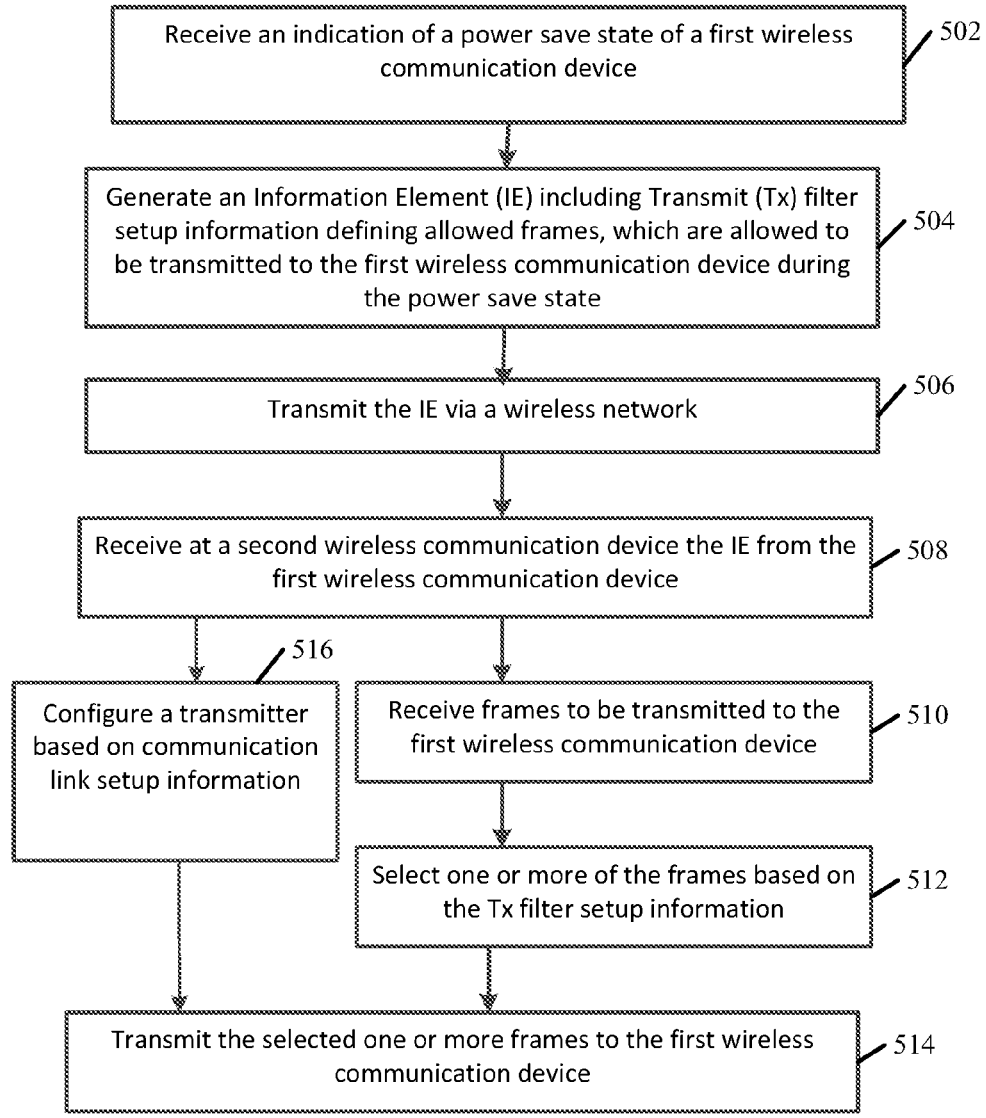
FIG. 5 is a schematic flow chart illustration of a method of wireless communication during a power save state, in accordance with some demonstrative embodiments.

Reference is now made to FIG. 5, which schematically illustrates a method of wireless communication during a power save state of a wireless communication device, in accordance with some demonstrative embodiments. For example, one or more of the operations of the method of FIG. 5 may be performed by a wireless communication system, e.g., system 100 (FIG. 1); a wireless communication device e.g., devices 120 and/or 140; a controller, e.g., controllers 134 and/or 154 (FIG. 1); an SME, e.g., SMEs 136 and/or 157 (FIG. 1); and/or a wireless network interface, e.g., wireless network interfaces 124 and/or 144 (FIG. 1).

As indicated at block 502, the method may include receiving an indication of a power save state of a wireless communication device. For example, controller 134 (FIG. 1) may receive from OS 125 (FIG. 1) the indication of the power save state of wireless communication device 120 (FIG. 1), e.g., as described above.

As indicated at block 504, the method may include generating an Information Element (IE) including Transmit (Tx) filter setup information defining allowed frames, which are allowed to be transmitted to the wireless communication device during the power save state. For example, controller 134 (FIG. 1) may generate IE 200 (FIG. 2) including the TX filter setup information, e.g., as described above.

As indicated at block 506, the method may include transmitting the IE via a wireless network. For example, transmitter 128 (FIG. 1) may transmit IE 200 (FIG. 2) via wireless network 103 (FIG. 1), e.g., as described above.

As indicated at block 508, the method may include receiving the IE at a second wireless communication device. For example, controller 144 (FIG. 1) may receive IE 200 (FIG. 2), e.g., as described above.

As indicated at block 510, the method may include receiving frames to be transmitted to the first wireless communication device. For example, controller 144 (FIG. 1) may receive from OS 155 (FIG. 1) frames to be transmitted to device 120 (FIG. 1), e.g., as described above.

As indicated at block 512, the method may include selecting one or more of the frames based on the Tx filter setup information. For example, Tx filter module 156 (FIG. 1) may select one or more of the frames based on the Tx filter setup information, e.g., as described above.

As indicated at block 516, the method may include configuring a transmitter of the second wireless communication device based on communication link setup information, for example, if the IE includes the communication link setup information, e.g., as described above. For example, controller 144 (FIG. 1) may configure transmitter 148 (FIG. 1) based on the communication link setup information of IE 200 (FIG. 2), e.g., as described above.

As indicated at block 514, the method may include transmitting the one or more selected frames to the first wireless communication device. For example, transmitter 148 (FIG. 1) may transmit the one or more selected frames to device 120 (FIG. 1), e.g., as described above.

Figure 6:
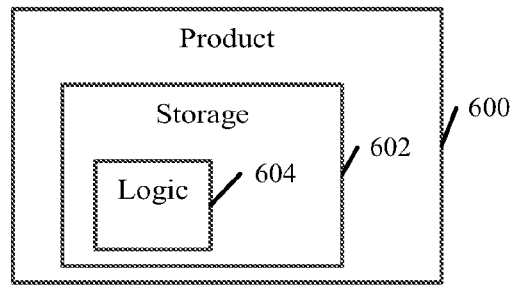
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602 to store logic 604, which may be used, for example, to perform at least part of the functionality of device 120 (FIG. 1), device 140 (FIG. 1), wireless network interfaces 122 and/or 142 (FIG. 1), (FIG. 1), controllers 134 and/or 154 (FIG. 1), SMEs 136 and/or 157, and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or media 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless network interface to interface between a wireless communication device and a wireless network, the wireless network interface comprising a controller to receive an indication of a power save state of the wireless communication device, and to generate an Information Element (IE) including Transmit (Tx) filter setup information defining allowed frames, which are allowed to be transmitted to the wireless communication device during the power save state; and a transmitter to transmit the IE via the wireless network.

Example 2 includes the subject matter of Example 1, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 3 includes the subject matter of Example 1 or 2, and optionally, wherein the IE includes communication link setup information defining a wireless communication link to communicate with the wireless communication device during the power save state.

Example 4 includes the subject matter of Example 3, and optionally, wherein the communication link setup information includes at least one type of information selected from the group consisting of antenna configuration information, Modulation and Coding Scheme (MCS) information, and scheduling information.

Example 5 includes the subject matter of any one of Examples 1-4, and optionally, wherein the IE includes a power state indicator, the controller is to set the power state indicator to indicate the power save state.

Example 6 includes the subject matter of Example 5, and optionally, wherein the controller is to transmit a connect invitation including the IE with the power state indicator set to indicate the power save state.

Example 7 includes the subject matter of Example 5 or 6, and optionally, wherein the controller is to receive an indication of an active power state of the wireless communication device, the transmitter to transmit another IE including the power state indicator set to indicate the active power state.

Example 8 includes the subject matter of any one of Examples 1-7, and optionally, wherein the controller is to receive configuration information from an Operating System (OS) of the wireless communication device, and to configure the Tx filter setup information based on the configuration information.

Example 9 includes the subject matter of any one of Examples 1-8, and optionally, wherein the controller comprises a station management entity (SME) to receive the indication of the power save state from an Operating System (OS) of the wireless communication device, and to configure the transmitter to transmit the IE via the wireless network.

Example 10 includes a wireless network interface to interface between a first wireless communication device and a wireless network, the wireless network interface comprising a receiver to receive from a second wireless communication device an Information Element (IE) including a power state indicator being set to indicate a power save state, and Tx filter setup information defining allowed frames, which are allowed to be transmitted to the second wireless communication device; a transmit (Tx) filter module to select one or more selected frames to be communicated to the second wireless communication device based on the Tx filter setup information; and a transmitter to transmit the one or more selected frames.

Example 11 includes the subject matter of Example 10, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 12 includes the subject matter of Example 10 or 11, and optionally, wherein the IE includes communication link setup information to define a wireless communication link to communicate with the second wireless communication device during the power save state, and wherein the transmitter is to transmit the selected frames based on the communication link setup information.

Example 13 includes the subject matter of Example 12, and optionally, wherein the communication link setup information includes at least one type of information selected from the group consisting of antenna configuration information, Modulation and Coding Scheme (MCS) information, and scheduling information.

Example 14 includes the subject matter of any one of Examples 10-13, and optionally, including a controller to configure the Tx filter module based on the Tx filter setup information, and to reset the Tx filter module upon receipt of an IE with the power state indicator being set to indicate an active power state.

Example 15 includes the subject matter of any one of Examples 10-14, and optionally, wherein the receiver is to receive a connect invitation of connection establishment with the second wireless communication device, the connect invitation including an IE with the power state indicator being set to indicate the power save state, the wireless network interface to execute an association phase of the connection establishment upon receipt of an indication that the second wireless communication device is at an active state.

Example 16 includes the subject matter of any one of Examples 10-15, and optionally, including a station management entity (SME) to receive the Tx filter setup information from the receiver and to configure the Tx filter module based on the Tx filter setup information.

Example 17 includes a method performed at a wireless communication device, the method comprising receiving an indication of a power save state of the device; generating an Information Element (IE) including Transmit (Tx) filter setup information defining allowed frames, which are allowed to be transmitted to the wireless communication device during the power save state; and transmitting the IE via a wireless network.

Example 18 includes the subject matter of Example 17, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 19 includes the subject matter of Example 17 or 18, and optionally, wherein the IE includes communication link setup information defining a wireless communication link to communicate with the wireless communication device during the power save state.

Example 20 includes the subject matter of Example 19, and optionally, wherein the communication link setup information includes at least one type of information selected from the group consisting of antenna configuration information, Modulation and Coding Scheme (MCS) information, and scheduling information.

Example 21 includes the subject matter of any one of Examples 17-20, and optionally, comprising setting a power state indicator of the IE to indicate the power save state.

Example 22 includes the subject matter of Example 21, and optionally, comprising transmitting a connect invitation including the IE with the power state indicator set to indicate the power save state.

Example 23 includes the subject matter of Example 21 or 22, and optionally, comprising receiving an indication of an active power state of the wireless communication device, and transmitting another IE including the power state indicator set to indicate the active power state.

Example 24 includes the subject matter of any one of Examples 17-23, and optionally, comprising receiving configuration information from an Operating System (OS) of the wireless communication device, and configuring the Tx filter setup information based on the configuration information.

Example 25 includes a method performed at a first wireless communication device, the method comprising receiving from a second wireless communication device an Information Element (IE) including a power state indicator being set to indicate a power save state, and Tx filter setup information defining allowed frames, which are allowed to be transmitted to the wireless communication device; based on the Tx filter setup information, selecting one or more frames to be transmitted to the second wireless communication device; and transmitting the one or more frames to the second wireless communication device.

Example 26 includes the subject matter of Example 25, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 27 includes the subject matter of Example 25 or 26, and optionally, wherein the IE includes communication link setup information to define a wireless communication link to communicate with the second wireless communication device during the power save state, and wherein transmitting the frames comprises transmitting the frames based on the communication link setup information.

Example 28 includes the subject matter of Example 27, and optionally, wherein the communication link setup information includes at least one type of information selected from the group consisting of antenna configuration information, Modulation and Coding Scheme (MCS) information, and scheduling information.

Example 29 includes the subject matter of any one of Examples 25-28, and optionally, comprising resetting the selecting of the frames, upon receipt of an IE with the power state indicator being set to indicate an active power state.

Example 30 includes the subject matter of any one of Examples 25-29, and optionally, comprising receiving a connect invitation of connection establishment with the wireless communication device, the connect invitation including an IE with the power state indicator being set to indicate the power save state, and executing an association phase of the connection establishment upon receipt of an indication that the second wireless communication device is at an active state.

Example 31 includes a product including one or more tangible computer-readable non-transitory storage media comprising computer-executable instructions operable to, when executed by at least one computer processor, enable the at least one computer processor to implement a method comprising receiving, at a wireless network interface of a wireless communication device, an indication of a power save state of the wireless communication device; generating an Information Element (IE) including Transmit (Tx) filter setup information defining allowed frames, which are allowed to be transmitted to the wireless communication device during the power save state; and transmitting the IE via a wireless network.

Example 32 includes the subject matter of Example 31, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 33 includes the subject matter of Example 31 or 32, and optionally, wherein the IE includes communication link setup information defining a wireless communication link to communicate with the wireless communication device during the power save state.

Example 34 includes the subject matter of Example 33, and optionally, wherein the communication link setup information includes at least one type of information selected from the group consisting of antenna configuration information, Modulation and Coding Scheme (MCS) information, and scheduling information.

Example 35 includes the subject matter of any one of Examples 31-34, and optionally, wherein the method comprises setting a power state indicator of the IE to indicate the power save state.

Example 36 includes the subject matter of Example 35, and optionally, wherein the method comprises transmitting a connect invitation including the IE with the power state indicator set to indicate the power save state.

Example 37 includes the subject matter of Example 35 or 36, and optionally, wherein the method comprises receiving an indication of an active power state of the wireless communication device, and transmitting another IE including the power state indicator set to indicate the active power state.

Example 38 includes the subject matter of any one of Examples 31-37, and optionally, wherein the method comprises receiving configuration information from an Operating System (OS) of the wireless communication device, and configuring the Tx filter setup information based on the configuration information.

Example 39 includes a product including one or more tangible computer-readable non-transitory storage media comprising computer-executable instructions operable to, when executed by at least one computer processor, enable the at least one computer processor to implement a method comprising receiving, at a wireless network interface of a first wireless communication device an Information Element (IE) from a second wireless communication device via a wireless network, the IE including a power state indicator being set to indicate a power save state, and Tx filter setup information defining allowed frames, which are allowed to be transmitted to the second wireless communication device; based on the Tx filter setup information, selecting one or more frames to be transmitted to the second wireless communication device; and transmitting the one or more frames to the second wireless communication device via the wireless network.

Example 40 includes the subject matter of Example 39, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 41 includes the subject matter of Example 39 or 40, and optionally, wherein the IE includes communication link setup information to define a wireless communication link to communicate with the second wireless communication device during the power save state, and wherein transmitting the frames comprises transmitting the frames based on the communication link setup information.

Example 42 includes the subject matter of Example 41, and optionally, wherein the communication link setup information includes at least one type of information selected from the group consisting of antenna configuration information, Modulation and Coding Scheme (MCS) information, and scheduling information.

Example 43 includes the subject matter of any one of Examples 39-42, and optionally, wherein the method comprises resetting the selection of the frames, upon receipt of an IE with the power state indicator being set to indicate an active power state.

Example 44 includes the subject matter of any one of Examples 39-43, and optionally, wherein the method comprises receiving a connect invitation of connection establishment with the wireless communication device, the connect invitation including an IE with the power state indicator being set to indicate the power save state, and executing an association phase of the connection establishment upon receipt of an indication that the second wireless communication device is at an active state.

Example 45 includes a wireless communication device comprising one or more antennas; a memory; a processor; and a wireless network interface to interface between the wireless communication device and a wireless network, the wireless network interface comprising a controller to receive from an Operating System (OS) of the wireless communication device an indication of a power save state of the wireless communication device, and to generate an Information Element (IE) including Transmit (Tx) filter setup information defining allowed frames, which are allowed to be transmitted to the wireless communication device during the power save state; and a transmitter to transmit the IE via the wireless network.

Example 46 includes the subject matter of Example 45, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 47 includes the subject matter of Example 45 or 46, and optionally, wherein the IE includes communication link setup information defining a wireless communication link to communicate with the wireless communication device during the power save state.

Example 48 includes the subject matter of Example 47, and optionally, wherein the communication link setup information includes at least one type of information selected from the group consisting of antenna configuration information, Modulation and Coding Scheme (MCS) information, and scheduling information.

Example 49 includes the subject matter of any one of Examples 45-48, and optionally, wherein the IE includes a power state indicator, the controller is to set the power state indicator to indicate the power save state.

Example 50 includes the subject matter of Example 49, and optionally, wherein the controller is to transmit a connect invitation including the IE with the power state indicator set to indicate the power save state.

Example 51 includes the subject matter of Example 49 or 50, and optionally, wherein the controller is to receive an indication of an active power state of the wireless communication device, the transmitter to transmit another IE including the power state indicator set to indicate the active power state.

Example 52 includes the subject matter of any one of Examples 45-51, and optionally, wherein the controller is to receive configuration information from an Operating System (OS) of the wireless communication device, and to configure the Tx filter setup information based on the configuration information.

Example 53 includes the subject matter of any one of Examples 45-52, and optionally, wherein the controller comprises a station management entity (SME) to receive the indication of the power save state from an Operating System (OS) of the wireless communication device, and to configure the transmitter to transmit the IE via the wireless network.

Example 54 includes a first wireless communication device comprising one or more antennas; a memory; a processor; and a wireless network interface to interface between the first communication device and a wireless network, the wireless network interface comprising a receiver to receive from a second wireless communication device an Information Element (IE) including a power state indicator being set to indicate a power save state, and Tx filter setup information defining allowed frames, which are allowed to be transmitted to the second wireless communication device; a transmit (Tx) filter module; a controller to configure the Tx filter module to select one or more selected frames to be communicated to the second wireless communication device based on the Tx filter setup information; and a transmitter to transmit the one or more selected frames to the second wireless communication device.

Example 55 includes the subject matter of Example 54, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 56 includes the subject matter of Example 54 or 55, and optionally, wherein the IE includes communication link setup information to define a wireless communication link to communicate with the second wireless communication device during the power save state, and wherein the controller is to configure the transmitter based on the communication link setup information.

Example 57 includes the subject matter of Example 56, and optionally, wherein the communication link setup information includes at least one type of information selected from the group consisting of antenna configuration information, Modulation and Coding Scheme (MCS) information, and scheduling information.

Example 58 includes the subject matter of any one of Examples 54-57, and optionally, wherein the controller is to reset the Tx filter module upon receipt of an IE with the power state indicator being set to indicate an active power state.

Example 59 includes the subject matter of any one of Examples 54-58, and optionally, wherein the receiver is to receive a connect invitation of connection establishment with the second wireless communication device, the connect invitation including an IE with the power state indicator being set to indicate the power save state, the controller to execute an association phase of the connection establishment upon receipt of an indication that the second wireless communication device is at an active state.

Example 60 includes the subject matter of any one of Examples 54-59, and optionally, wherein the controller comprises a station management entity (SME) to receive the Tx filter setup information from the receiver and to configure the Tx filter module based on the Tx filter setup information.

Example 61 includes an apparatus comprising means for receiving, at a wireless communication device, an indication of a power save state of the device; means for generating an Information Element (IE) including Transmit (Tx) filter setup information defining allowed frames, which are allowed to be transmitted to the wireless communication device during the power save state; and means for transmitting the IE via a wireless network.

Example 62 includes the subject matter of Example 61, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 63 includes the subject matter of Example 61 or 62, and optionally, wherein the IE includes communication link setup information defining a wireless communication link to communicate with the wireless communication device during the power save state.

Example 64 includes the subject matter of Example 63, and optionally, wherein the communication link setup information includes at least one type of information selected from the group consisting of antenna configuration information, Modulation and Coding Scheme (MCS) information, and scheduling information.

Example 65 includes the subject matter of any one of Examples 61-64, and optionally, comprising means for setting a power state indicator of the IE to indicate the power save state.

Example 66 includes the subject matter of Example 65, and optionally, comprising means for transmitting a connect invitation including the IE with the power state indicator set to indicate the power save state.

Example 67 includes the subject matter of Example 65 or 66, and optionally, comprising means for receiving an indication of an active power state of the wireless communication device, and transmitting another IE including the power state indicator set to indicate the active power state.

Example 68 includes the subject matter of any one of Examples 61-67, and optionally, comprising means for receiving configuration information from an Operating System (OS) of the wireless communication device, and configuring the Tx filter setup information based on the configuration information.

Example 69 includes an apparatus comprising means for receiving, at a first wireless communication device, an Information Element (IE), from a second wireless communication device, the IE including a power state indicator being set to indicate a power save state, and Tx filter setup information defining allowed frames, which are allowed to be transmitted to the wireless communication device; means for selecting one or more frames to be transmitted to the second wireless communication device, based on the Tx filter setup information; and means for transmitting the one or more frames to the second wireless communication device.

Example 70 includes the subject matter of Example 69, and optionally, wherein the Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

Example 71 includes the subject matter of Example 69 or 70, and optionally, wherein the IE includes communication link setup information to define a wireless communication link to communicate with the second wireless communication device during the power save state, and wherein transmitting the frames comprises transmitting the frames based on the communication link setup information.

Example 72 includes the subject matter of Example 71, and optionally, wherein the communication link setup information includes at least one type of information selected from the group consisting of antenna configuration information, Modulation and Coding Scheme (MCS) information, and scheduling information.

Example 73 includes the subject matter of any one of Examples 69-72, and optionally, comprising means for resetting the means for selecting the frames, upon receipt of an IE with the power state indicator being set to indicate an active power state.

Example 74 includes the subject matter of any one of Examples 69-73, and optionally, comprising means for receiving a connect invitation of connection establishment with the wireless communication device, the connect invitation including an IE with the power state indicator being set to indicate the power save state, and executing an association phase of the connection establishment upon receipt of an indication that the second wireless communication device is at an active state.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless network interface to interface between a wireless communication device and a wireless network, the wireless network interface comprising:
   a controller configured to receive an indication of a power save state of said wireless communication device, and to generate an Information Element (IE) including Transmit (Tx) filter setup information defining allowed frames, which are allowed to be transmitted to said wireless communication device during said power save state, the controller is configured to set a power state indicator in the IE to indicate said power save state; and
   a transmitter including a Physical layer (PHY) configured to transmit a connect invitation including said IE via said wireless network.

2. The wireless network interface of claim 1, wherein said Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

3. The wireless network interface of claim 1, wherein said IE includes communication link setup information defining a wireless communication link to communicate with said wireless communication device during said power save state.

4. The wireless network interface of claim 3, wherein said communication link setup information includes at least one type of information selected from the group consisting of antenna configuration information, Modulation and Coding Scheme (MCS) information, and scheduling information.

5. The wireless network interface of claim 1, wherein said controller is to receive configuration information from an Operating System (OS) of said wireless communication device, and to configure the Tx filter setup information based on the configuration information.

6. The wireless network interface of claim 1, wherein said controller comprises:
   a station management entity (SME) to receive the indication of the power save state from an Operating System (OS) of said wireless communication device, and to configure said transmitter to transmit said IE via said wireless network.

7. A wireless network interface to interface between a wireless communication device and a wireless network, the wireless network interface comprising:
   a controller configured to receive an indication of a power save state of said wireless communication device, and to generate an Information Element (IE) including Transmit (Tx) filter setup information defining allowed frames, which are allowed to be transmitted to said wireless communication device during said power save state, said controller is configured to set a power state indicator in the IE to indicate said power save state; and
   a transmitter including a Physical layer (PHY) configured to transmit said IE via said wireless network,
   wherein, based on a received indication of an active power state of said wireless communication device, said controller is configured to generate another IE including said power state indicator set to indicate said active power state, and said transmitter is to transmit the another IE.

8. The wireless network interface of claim 7, wherein said Tx filter setup information comprises at least one type of information selected from the group consisting of frame type information defining one or more allowed types of frames, frame pattern information defining one or more allowed frame patterns, information defining one or more allowed frame sizes, and content information defining allowed frame content.

9. The wireless network interface of claim 7, wherein said controller is to receive configuration information from an Operating System (OS) of said wireless communication device, and to configure the Tx filter setup information based on the configuration information.

10. A wireless network interface to interface between a first wireless communication device and a wireless network, the wireless network interface comprising:
    a receiver to receive from a second wireless communication device an Information Element (IE) including a power state indicator set to indicate a power save state, and Tx filter setup information defining allowed frames, which are allowed to be transmitted to said second wireless communication device;
    a transmit (Tx) filter module to select one or more selected frames to be communicated to the second wireless communication device based on said Tx filter setup information;
    a controller to configure said Tx filter module based on said Tx filter setup information, and to reset said Tx filter module upon receipt of an IE with the power state indicator set to indicate an active power state; and
a transmitter to transmit said one or more selected frames.

11. The wireless network interface of claim 10, wherein said Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

12. The wireless network interface of claim 10, wherein said IE includes communication link setup information to define a wireless communication link to communicate with said second wireless communication device during said power save state, and wherein said transmitter is to transmit said selected frames based on said communication link setup information.

13. The wireless network interface of claim 12, wherein said communication link setup information includes at least one type of information selected from the group consisting of antenna configuration information, Modulation and Coding Scheme (MCS) information, and scheduling information.

14. The wireless network interface of claim 10 comprising:
a station management entity (SME) to receive said Tx filter setup information from said receiver and to configure said Tx filter module based on said Tx filter setup information.

15. A wireless network interface to interface between a first wireless communication device and a wireless network, the wireless network interface comprising:
a receiver configured to receive from a second wireless communication device a connect invitation of connection establishment with said second wireless communication device, the connect invitation including an Information Element (IE) including a power state indicator set to indicate a power save state, and Tx filter setup information defining allowed frames, which are allowed to be transmitted to said second wire communication device;
a transmit (Tx) filter module configured to select one or more selected frames to be communicated to the second wireless communication device based on said Tx filter setup information;
a transmitter configured to transmit said one or more selected frames; and
a controller configured to control said wireless network interface to execute an association phase of said connection establishment upon receipt of an indication that said second wireless communication device is at an active state.

16. The wireless network interface of claim 15, wherein said Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

17. A product including one or more tangible computer-readable non-transitory storage media comprising computer-executable instructions operable to, when executed by at least one computer processor, enable the at least one computer processor to implement one or more operations, the operations comprising:

receiving, at a wireless network interface of a wireless communication device, an indication of a power save state of said wireless communication device;
generating an Information Element (IE) including Transmit (Tx) filter setup information defining allowed frames, which are allowed to be transmitted to said wireless communication device during said power save state, the IE comprising a power state indicator to indicate said power save state;
transmitting said IE via a wireless network; and
based on a received indication of an active power state of said wireless communication device, generating another IE including said power state indicator set to indicate said active power state, and transmitting the another IE.

18. The product of claim 17, wherein said Tx filter setup information comprises at least one type of information selected from the group consisting of frame type information defining one or more allowed types of frames, frame pattern information defining one or more allowed frame patterns, size information defining one or more allowed frame sizes, and content information defining allowed frame content.

19. The product of claim 17, wherein said IE includes communication link setup information defining a wireless communication link to communicate with said wireless communication device during said power save state.

20. The product of claim 19, wherein said communication link setup information includes at least one type of information selected from the group consisting of antenna configuration information, Modulation and Coding Scheme (MCS) information, and scheduling information.

21. The product of claim 17, wherein said operations comprise receiving configuration information from an Operating System (OS) of said wireless communication device, and configuring the Tx filter setup information based on the configuration information.

22. A product including one or more tangible computer-readable non-transitory storage media comprising computer-executable instructions operable to, when executed by at least one computer processor, enable the at least one computer processor to implement one or more operations, the operations comprising:
receiving, at a wireless network interface of a first wireless communication device an Information Element (IE) from a second wireless communication device via a wireless network, the IE including a power state indicator to indicate a power save state, and Tx filter setup information defining allowed frames, which are allowed to be transmitted to said second wireless communication device;
based on said Tx filter setup information, configuring a filter module to select one or more frames to be transmitted to said second wireless communication device;
transmitting said one or more frames to said second wireless communication device via said wireless network; and
resetting said filter module, upon receipt of another IE with the power state indicator to indicate an active power state.

23. The product of claim 22, wherein said IE includes communication link setup information to define a wireless communication link to communicate with said second wireless communication device during said power save state, and wherein transmitting said frames comprises transmitting said frames based on said communication link setup information.

24. The product of claim 22, wherein said operations comprise receiving a connect invitation of connection establishment with said wireless communication device, the connect invitation including the IE with the power state indicator to indicate said power save state, and executing an association phase of said connection establishment upon receipt of an indication that said second wireless communication device is at the active state.

* * * * *